(12) United States Patent
Tsai

(10) Patent No.: US 9,981,713 B2
(45) Date of Patent: May 29, 2018

(54) SUSPENSION DEVICE FOR BICYCLE FRONT FORK

(71) Applicant: Taiwan Hodaka Industrial Co., Ltd., Taipei (TW)

(72) Inventor: Black Tsai, Taipei (TW)

(73) Assignee: Taiwan Hodaka Industrial Co., Ltd., Taipei (TW)

( * ) Notice: Subject to any disclaimer, the term of this patent is extended or adjusted under 35 U.S.C. 154(b) by 0 days. days.

(21) Appl. No.: 15/334,370

(22) Filed: Oct. 26, 2016

(65) Prior Publication Data

US 2018/0111657 A1    Apr. 26, 2018

(51) Int. Cl.
*B62K 25/08* (2006.01)
*F16F 7/08* (2006.01)
*B62K 21/20* (2006.01)

(52) U.S. Cl.
CPC .............. *B62K 25/08* (2013.01); *B62K 21/20* (2013.01); *F16F 7/082* (2013.01); *B62K 2201/04* (2013.01)

(58) Field of Classification Search
CPC ........ B62K 21/20; B62K 25/04; B62K 25/06; B62K 25/08
See application file for complete search history.

(56) References Cited

U.S. PATENT DOCUMENTS

| | | | |
|---|---|---|---|
| 4,553,769 A | 11/1985 | Kawaguchi | |
| 5,494,302 A * | 2/1996 | Farris | B62K 21/20 |
| | | | 280/276 |
| 7,011,325 B2 * | 3/2006 | Kinzler | B62K 21/20 |
| | | | 188/322.15 |
| 8,181,978 B2 * | 5/2012 | Kinzler | B62K 25/08 |
| | | | 280/276 |
| 8,499,905 B2 | 8/2013 | Uchiyama et al. | |

FOREIGN PATENT DOCUMENTS

| | | | |
|---|---|---|---|
| CN | 2367529 Y | | 3/2000 |
| CN | 201082744 Y | | 7/2008 |
| CN | 201283982 Y | | 8/2009 |
| CN | 203519242 U | | 4/2014 |
| CN | 105041957 A | | 11/2015 |
| CN | 204756711 U | | 11/2015 |
| CN | 206317954 U | * | 7/2017 |
| TW | 327873 U | | 3/1998 |
| TW | 584115 U | | 4/2004 |
| TW | M440254 U | | 11/2012 |
| TW | I385094 B | | 2/2013 |
| TW | I589481 B | | 7/2017 |

* cited by examiner

*Primary Examiner* — Kevin Hurley
(74) *Attorney, Agent, or Firm* — Alan D. Kamrath; Kamrath IP Lawfirm, P.A.

(57) ABSTRACT

A suspension device of a bicycle front fork is installed in a head tube of a bicycle handlebar. The suspension device includes: a cylinder with a bottom fixed to a base of the bicycle front fork and a top passed into the head tube; a piston rod with a top fixed to an inner wall of the head tube and a bottom having a piston and extended into the cylinder; a spring device coupled to the piston rod and having a force to push the piston rod away from the cylinder. The cylinder below the piston has an air chamber communicated with an intake valve of the base. The air pressure of air chamber may be adjusted to adjust the buffering pressure of the spring device, so that a user may adjust the shocking pressure of the front fork.

10 Claims, 6 Drawing Sheets

SUSPENSION DEVICE FOR BICYCLE FRONT FORK

BACKGROUND OF THE INVENTION

Field of the Invention

The present invention relates to a suspension device of a bicycle front fork, and more particularly to the suspension device capable of adjusting the shock pressure of the bicycle front fork.

Description of the Related Art

In general, a conventional suspension device of a bicycle front fork is installed in a head tube of a bicycle handlebar. The suspension device comprises: a cylinder with a bottom coupled to a base of the bicycle front fork and a top passed into the head tube; a piston rod with a top coupled to an inner wall of the head tube and a bottom having a piston and extended into the cylinder; a spring device with a top coupled to the top of the piston rod and a bottom coupled to the cylinder and capable of providing a force to push the head tube and the piston rod upward. The shock absorption and buffering pressure of the suspension device of the bicycle front fork depends entirely on the coefficient of elasticity of the spring device. As long as a bicycle manufacturer has selected a buffering device with a coefficient of elasticity, the shock absorption and buffering pressure of the front fork are fixed, and users cannot make adjustments anymore. Unless the spring device is replaced, the preload pressure of the buffering device is set in the manufacturing process. Therefore, the conventional suspension device cannot meet various different shock absorption requirements. In view of the drawbacks of the conventional suspension device, the inventor of the present invention conducted extensive researches and experiments, and finally developed a suspension device of the present invention to overcome the drawbacks of the prior art.

SUMMARY OF THE INVENTION

Therefore, it is a primary objective of the present invention to provide a suspension device of a bicycle front fork capable of adjusting the shock preload of a bicycle front fork.

To achieve the aforementioned and other objectives, the present invention discloses a suspension device of a bicycle front fork, and the suspension device comprises: an air chamber disposed in a cylinder below a piston and communicated with an intake valve of a base. The air pressure of the air chamber may be adjusted to adjust the buffering pressure of the spring device, so that a user may adjust the shock pressure of the front fork.

DETAILED DESCRIPTION OF THE PREFERRED EMBODIMENTS

Figure 1:
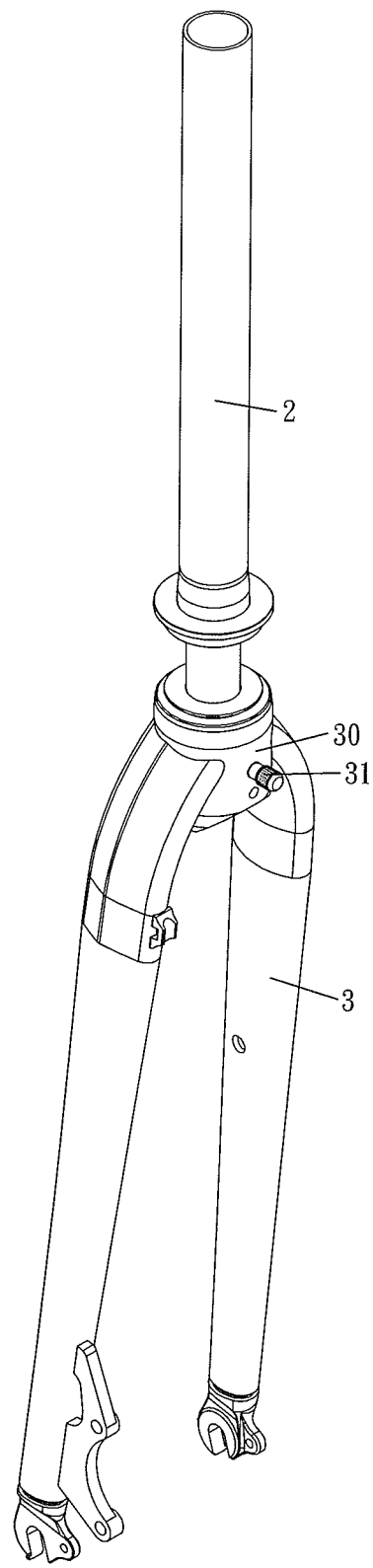
FIG. 1 is a perspective view of a suspension device of a bicycle front fork installed in a head tube of the front fork in accordance with an embodiment of the present invention.

The technical characteristics, contents, advantages and effects of the present invention will be apparent with the detailed description of a preferred embodiment accompanied with related drawings as follows.

With reference to FIGS. 1 to 5 for a suspension device 1 of a bicycle front fork in accordance with an embodiment of the present invention, the suspension device 1 comprises: a cylinder 10 with a bottom fixed to a base 30 disposed above the bicycle front fork 3 and a top passed into a head tube 2; a piston rod 11 with a top having a coupling seat 111 coupled to an inner wall of the head tube 2, such that the piston rod 11 is integrally linked with the head tube 2 and a bottom extended into the cylinder 10; a spring device 12 with a top fixed to the piston rod 11 and a bottom coupled to the cylinder 10 and having a force for pushing the head tube 2 and the piston rod 11 upward; and a buffer seat 13 with an elasticity and sheathed on the piston rod 11 and disposed between the piston 110 and a limiting wall 100 protruded inwardly from the inner wall of the cylinder 10. The cylinder 10 below the piston 110 has an air chamber 14, and the air chamber 14 is communicated with an intake valve 31 of the base 30, so that the air pressure inside the air chamber 14 can be adjusted.

Figure 2:
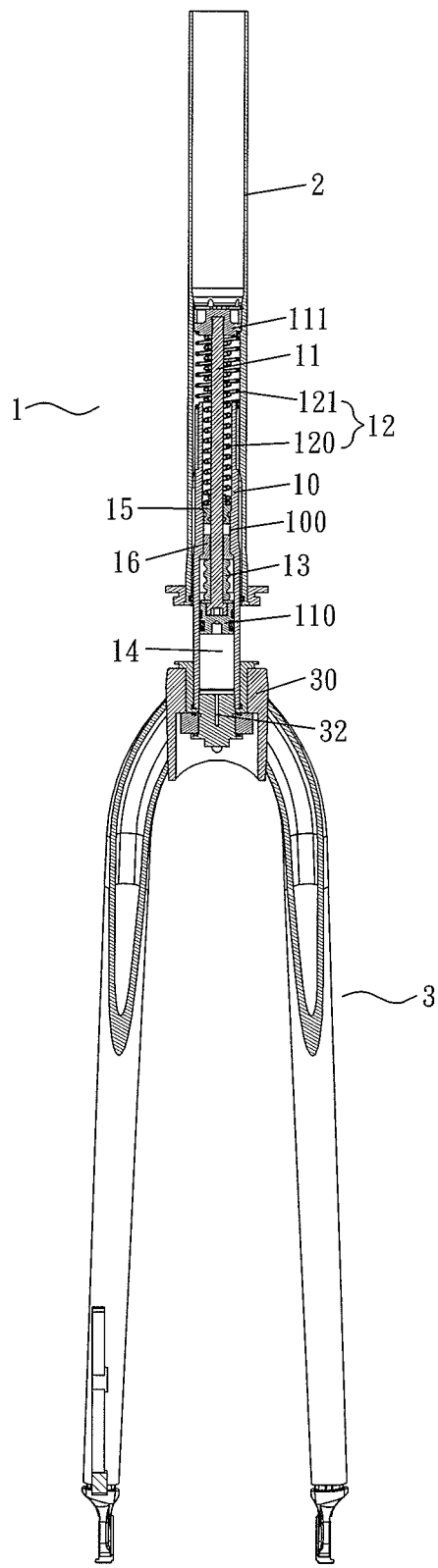
FIG. 2 is a front cross-sectional view of a suspension device of a bicycle front fork installed in a head tube of the front fork in accordance with an embodiment of the present invention.
Figure 3:
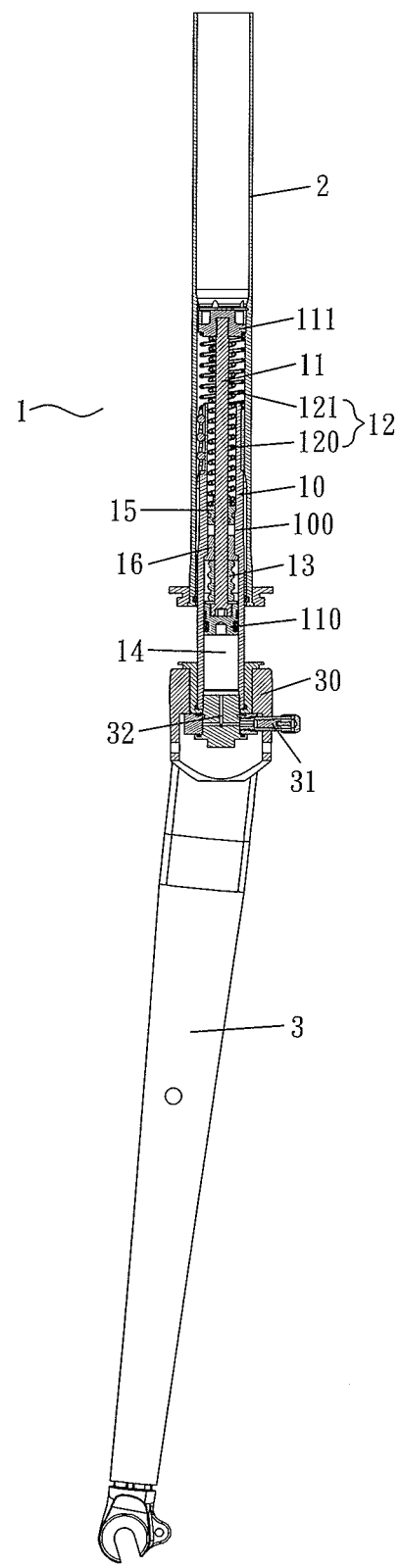
FIG. 3 is a side cross-sectional view of a suspension device of a bicycle front fork installed in a head tube of the front fork in accordance with an embodiment of the present invention.
Figure 5:
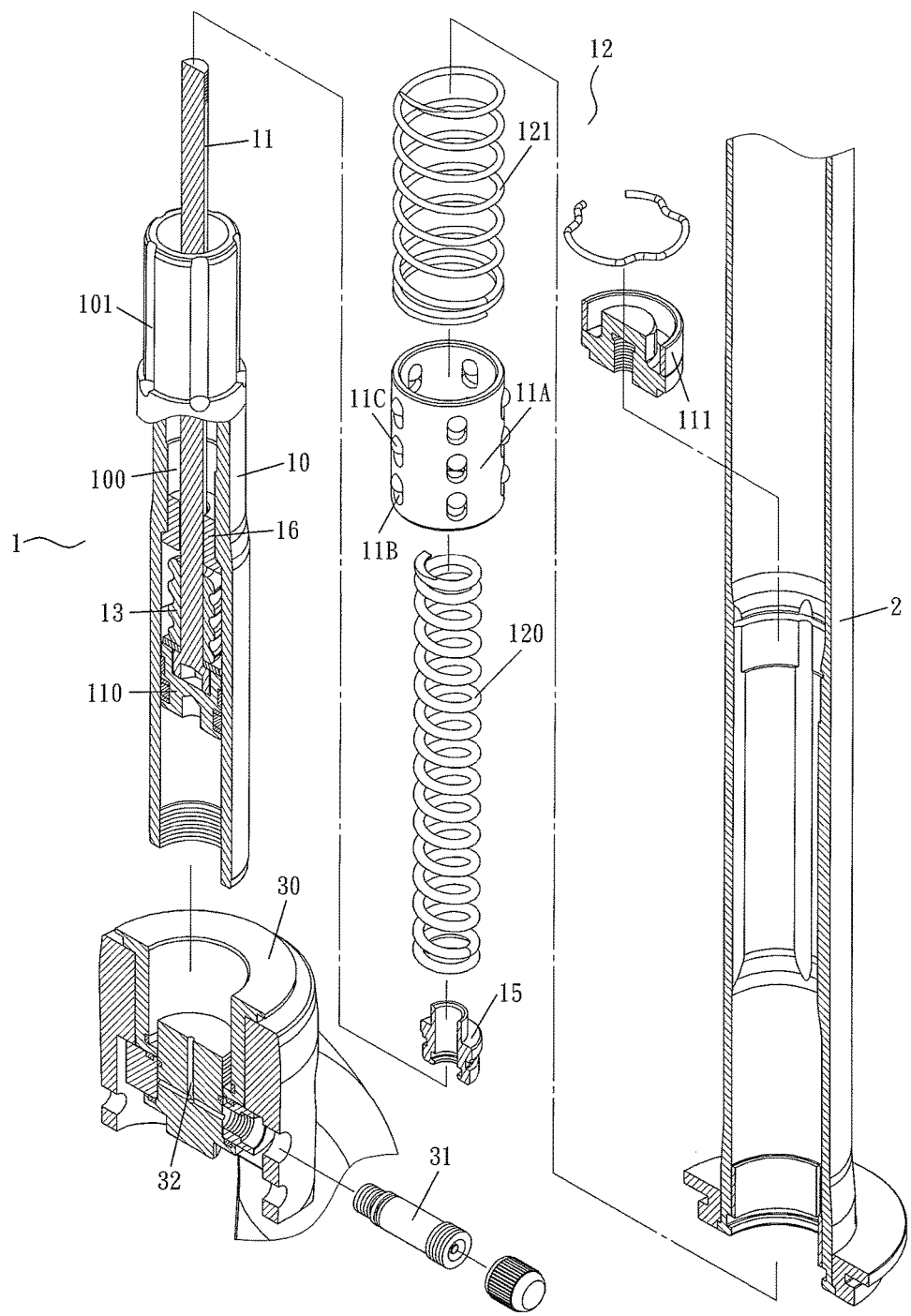
FIG. 5 is a partial cross-sectional exploded view of a suspension device of a bicycle front fork in accordance with an embodiment of the present invention.

In FIGS. 2, 3 and 5, the base 30 has an intake pipe 32 disposed therein and extended from an air inlet of the intake valve 31 into the air chamber 14.

Figure 4:
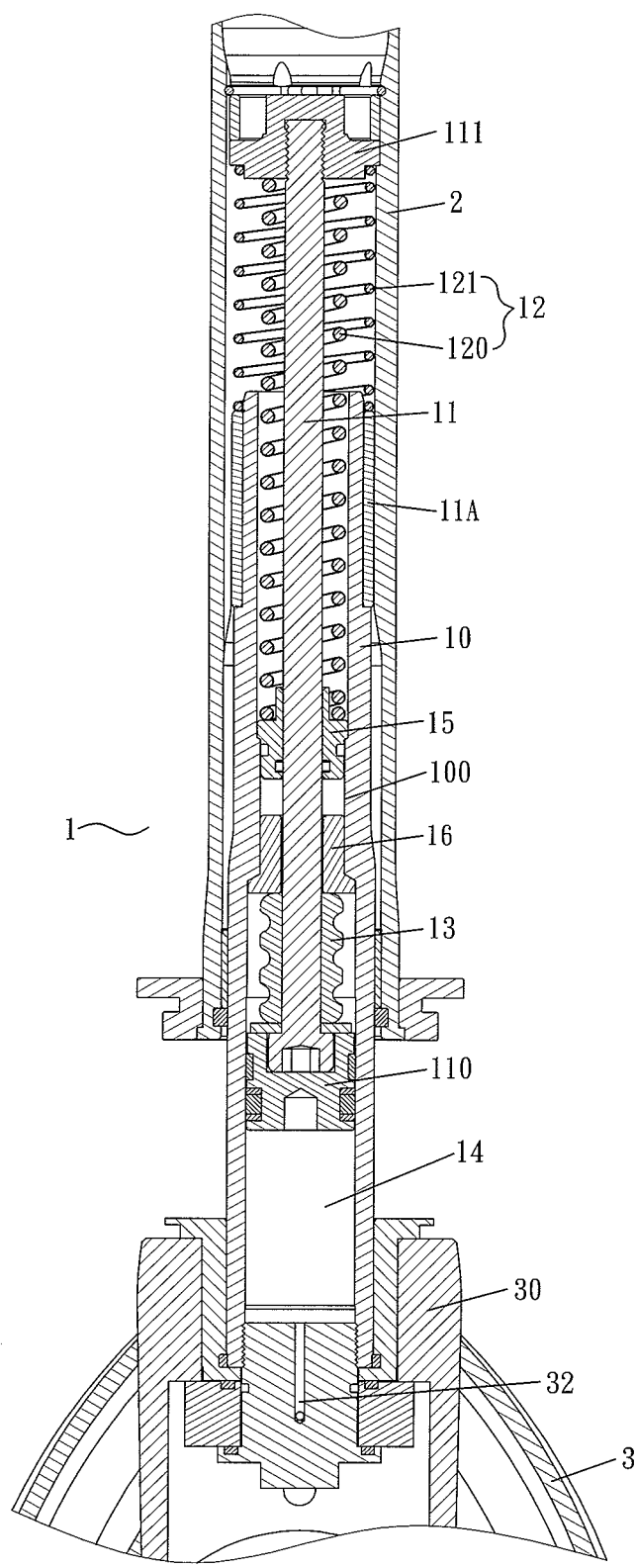
FIG. 4 is a partial blowup view of FIG. 2.
Figure 6:
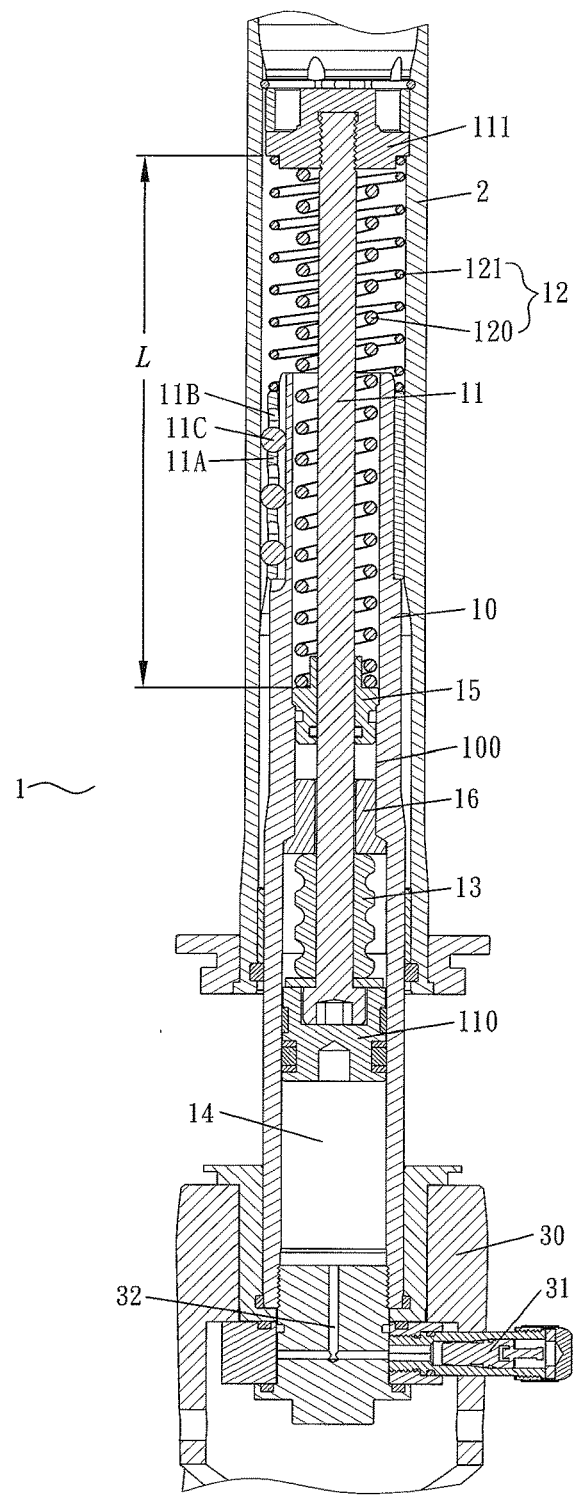
FIG. 6 is a partial blowup view of FIG. 3.

In FIGS. 4 to 6, the suspension device 1 has a sleeve 11A disposed therein and sheathed between the outer wall above the cylinder 10 and the head tube 2 for limiting the head tube 2 to move just in the axial direction. The cylindrical surface of the sleeve 11A has a plurality of slots 11B spaced from one another and having a lengthwise opening in an axial direction, and each slot 11B has a ball 11C embedded therein. The outer wall of the cylinder 10 has a plurality of spaced and axially arranged chutes 101, and the ball 11C of the sleeve 11A is embedded into the respective chute 101.

In FIGS. 4 to 6, the spring device 12 is comprised of a first spring 120 and a second spring 121. The first spring 120 is longer than the second spring 121, and the first spring 120 is installed in the second spring 121, and each of the first and second springs 120 121 has a top fixed to the coupling seat 111 and a bottom coupled to a fixed position of the cylinder 10 and provides a force to push the head tube 2 and the piston rod 11 upward.

In FIGS. 4 to 6, the suspension device 1 has a connecting seat 15 sheathed on the piston rod 11 and disposed at the top of the limiting wall 100, and the top of the connecting seat 15 is provided for touching the bottom of the first spring 120.

In FIGS. 4 to 6, the suspension device 1 has a positioning seat 16 sheathed on the piston rod 11 and disposed at the bottom of the limiting wall 100 and limited by the limiting wall 100 from moving towards the top of the limiting wall 100. The bottom of the positioning seat 16 is attached to the top of the buffer seat 13.

Figure 7:
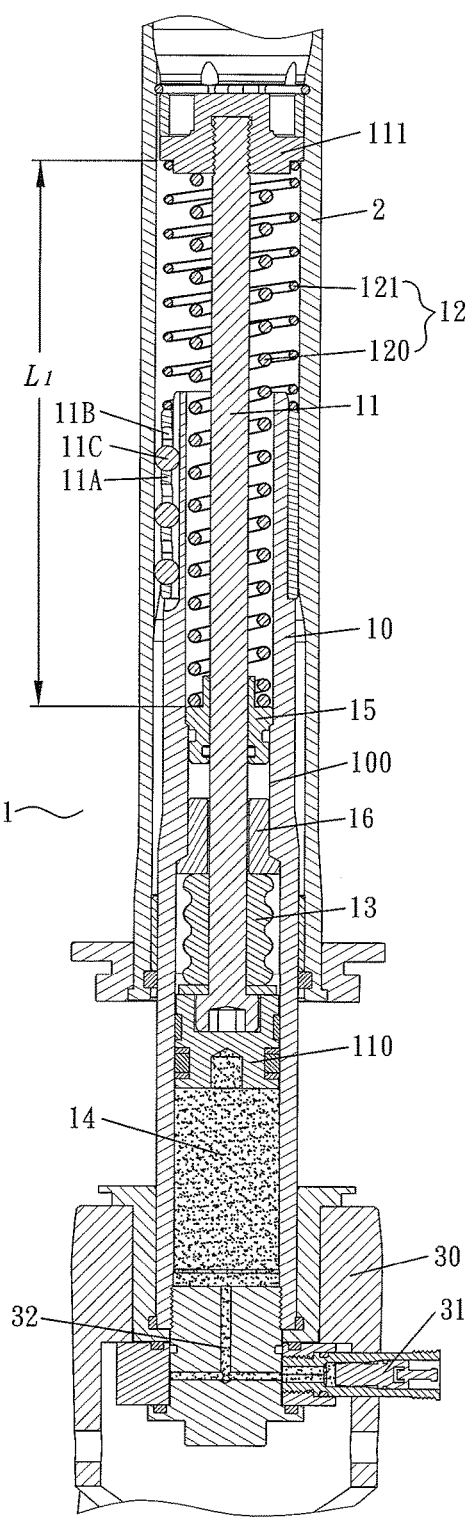
FIG. 7 is a schematic view of a suspension device of a bicycle front fork with air filled in an air chamber in accordance with an embodiment of the present invention.

In an application, if the air chamber 14 is not filled with air, the spring device 12 (including the first spring 120 and the second spring 121) has an elastic stretch length L (as shown in FIG. 6). If air is filled into the air chamber 14 from the intake valve 31, the air pressure inside the air chamber 14 will push the piston 110 to compress the buffer seat 13 to slide upward, so that the piston rod 11 and head tube 2 will move upward, and the spring device 12 (including the first spring 120 and the second spring 121) has an elastic stretch length $L_1$ (as shown in FIG. 7), and the elastic stretch length $L_1$ is longer than the elastic stretch length L (as shown in FIG. 6), so as to adjust the shock pressure of the spring device 12.

Figure 8:
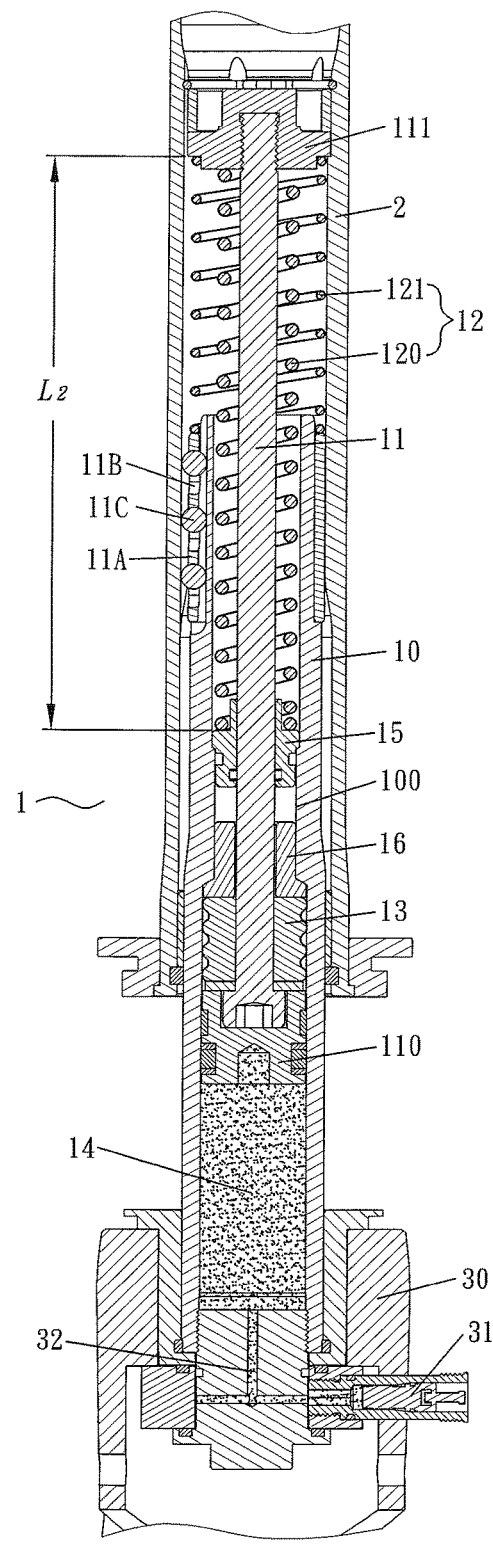
FIG. 8 is a schematic view of a suspension device of a bicycle front fork with more air filled in an air chamber in accordance with an embodiment of the present invention.

In FIG. 8, if more air is filled into the air chamber 14, the air pressure inside the air chamber 14 will be increased to push the piston 110 to compress the buffer seat 13 with a large force, so that the buffer seat 13 will be deformed, and the piston rod 11 and the head tube 2 will move further upward. Since the first spring 120 and the second spring 121 are pulled and stretched further, the elastic stretch length $L_2$ will be longer and the suspension stroke of the suspension device 1 will become longer.

Therefore, air may be filled into the air chamber, and the preload of the suspension device 1 may be adjusted by a bicycle rider, and the buffering pressure may be adjusted according to individual requirement.

In summation of the description above, the present invention complies with the patent application requirements, and thus is duly filed for patent application. While the invention has been described by means of specific embodiments, numerous modifications and variations could be made thereto by those skilled in the art without departing from the scope and spirit of the invention set forth in the claims.

What is claimed is:

1. A suspension device of a bicycle front fork, comprising:
    a cylinder with a bottom fixed to a base of the bicycle front fork and a top passing into a head tube of the bicycle;
    a piston rod, with a top coupled to a position of an inner wall of the head tube and a bottom having a piston extending into the cylinder;
    a spring device, installed between the piston rod and the cylinder, and capable of providing a force to push the head tube and the piston rod upward;
    a buffer seat, sheathed on the piston rod, and disposed between the piston and a limiting wall inside the cylinder; and
    an air chamber, disposed in the cylinder below the piston, and communicated with an intake valve on the base.

2. The suspension device of a bicycle front fork according to claim 1, wherein the base contains an intake pipe disposed therein and extended from an air inlet of the intake valve to the air chamber.

3. The suspension device of a bicycle front fork according to claim 1, further comprising a sleeve passed and sheathed between an outer wall of the cylinder and the head tube, and an outer wall of the sleeve having a plurality of spaced slots with a lengthwise opening arranged in an axial direction, and each slot having a ball embedded therein, and an outer wall at the top of the cylinder having a plurality of spaced and axially arranged chutes, and the ball of the sleeve being embedded in each respective chute.

4. The suspension device of a bicycle front fork according to claim 2, further comprising a sleeve passed and sheathed between an outer wall of the cylinder and the head tube, and an outer wall of the sleeve having a plurality of spaced slots with a lengthwise opening arranged in an axial direction, and each slot having a ball embedded therein, and an outer wall at the top of the cylinder having a plurality of spaced and axially arranged chutes, and the ball of the sleeve being embedded in each respective chute.

5. The suspension device of a bicycle front fork according to claim 3, wherein the spring device is comprised of a first spring and a second spring, and the first spring is longer than the second spring, and the first spring is installed in the second spring, and the first and second springs have a top fixed to the piston rod and a bottom contacted with the cylinder.

6. The suspension device of a bicycle front fork according to claim 4, wherein the spring device is comprised of a first spring and a second spring, and the first spring is longer than the second spring, and the first spring is installed in the second spring, and the first and second springs have a top fixed to the piston rod and a bottom contacted with the cylinder.

7. The suspension device of a bicycle front fork according to claim 5, further comprising a connecting seat sheathed on the piston rod and disposed above the limiting wall, and the top of the connecting seat being coupled to the first spring.

8. The suspension device of a bicycle front fork according to claim 6, further comprising a connecting seat sheathed on the piston rod and disposed above the limiting wall, and the top of the connecting seat being coupled to the first spring.

9. The suspension device of a bicycle front fork according to claim 5, further comprising a positioning seat sheathed on the piston rod and disposed below the limiting wall, and the bottom of the positioning seat being attached to the top of the buffer seat.

10. The suspension device of a bicycle front fork according to claim 6, further comprising a positioning seat sheathed on the piston rod and disposed below the limiting wall, and the bottom of the positioning seat being attached to the top of the buffer seat.

* * * * *